United States Patent [19]

Czech

[11] Patent Number: 4,917,345
[45] Date of Patent: Apr. 17, 1990

[54] ADJUSTABLE ROOF CURB

[75] Inventor: John R. Czech, Lemont, Ill.

[73] Assignee: Midwest Mechanical, Inc., Willowbrook, Ill.

[21] Appl. No.: 415,424

[22] Filed: Sep. 29, 1989

Related U.S. Application Data

[63] Continuation of Ser. No. 201,955, Jun. 3, 1988, abandoned.

[51] Int. Cl.⁴ ............................................. F16M 11/00
[52] U.S. Cl. ..................................... 248/678; 248/237
[58] Field of Search ................ 248/678, 237, 371, 148

[56] References Cited

U.S. PATENT DOCUMENTS

| | | | |
|---|---|---|---|
| 163,587 | 5/1875 | Fletcler | 248/237 |
| 894,295 | 7/1908 | Stoops | 248/237 |
| 3,108,803 | 10/1963 | Naideth | 248/237 X |
| 3,742,659 | 7/1973 | Drew | 52/19 |
| 4,033,531 | 7/1977 | Levine | 248/558 |

*Primary Examiner*—Alvin C. Chin-Shue
*Attorney, Agent, or Firm*—Myron C. Cass

[57] ABSTRACT

An adjustable support structure for an operating equipment that is adjustable in a plurality of directions so as to enable level mounting of the equipment with respect to the horizontal plane on a roof surface, for instance. The adjustable support structure includes a base member, a support member capable of accepting and supporting a desired piece of equipment, and means for adjustably coupling the support member to the base member including adjusting the position of the support member in a plurality of directions and maintaining the support member in a desired position with respect to the base member. The support structure can be used on a plurality of surfaces that are either relatively flat and level with respect to the horizontal plane or are inclined.

10 Claims, 2 Drawing Sheets

U.S. Patent    Apr. 17, 1990    Sheet 1 of 2    4,917,345
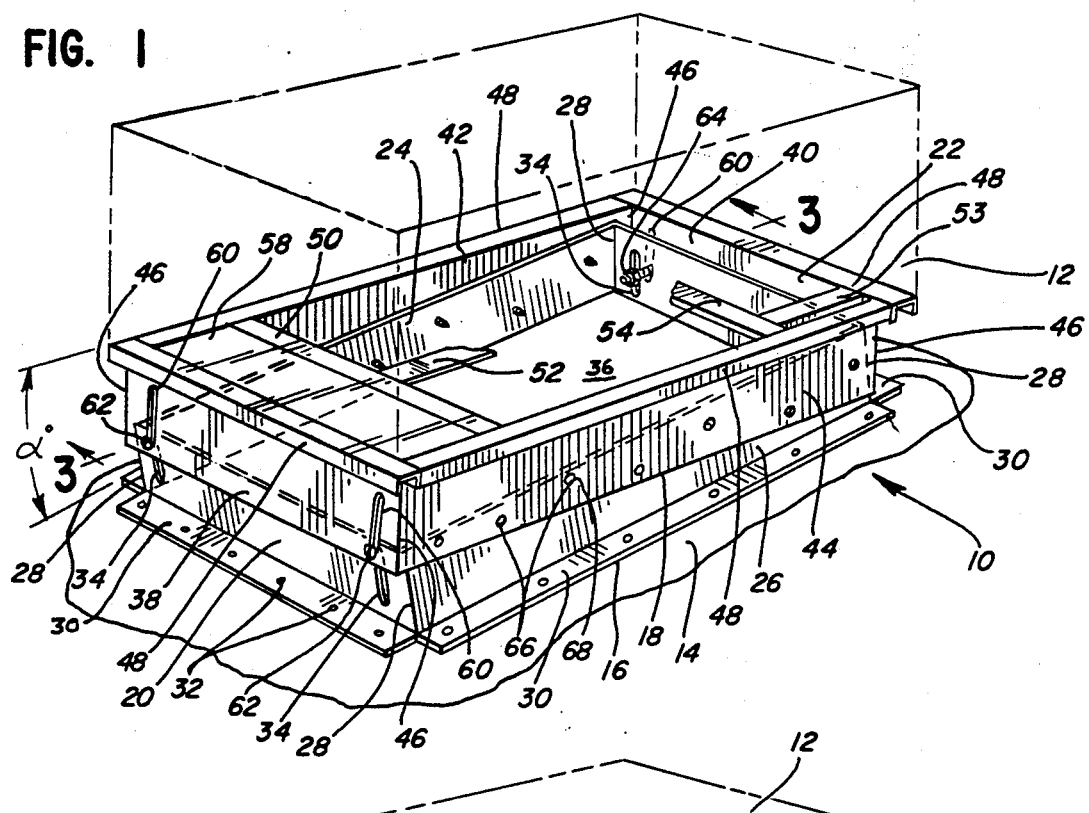
FIG. 1
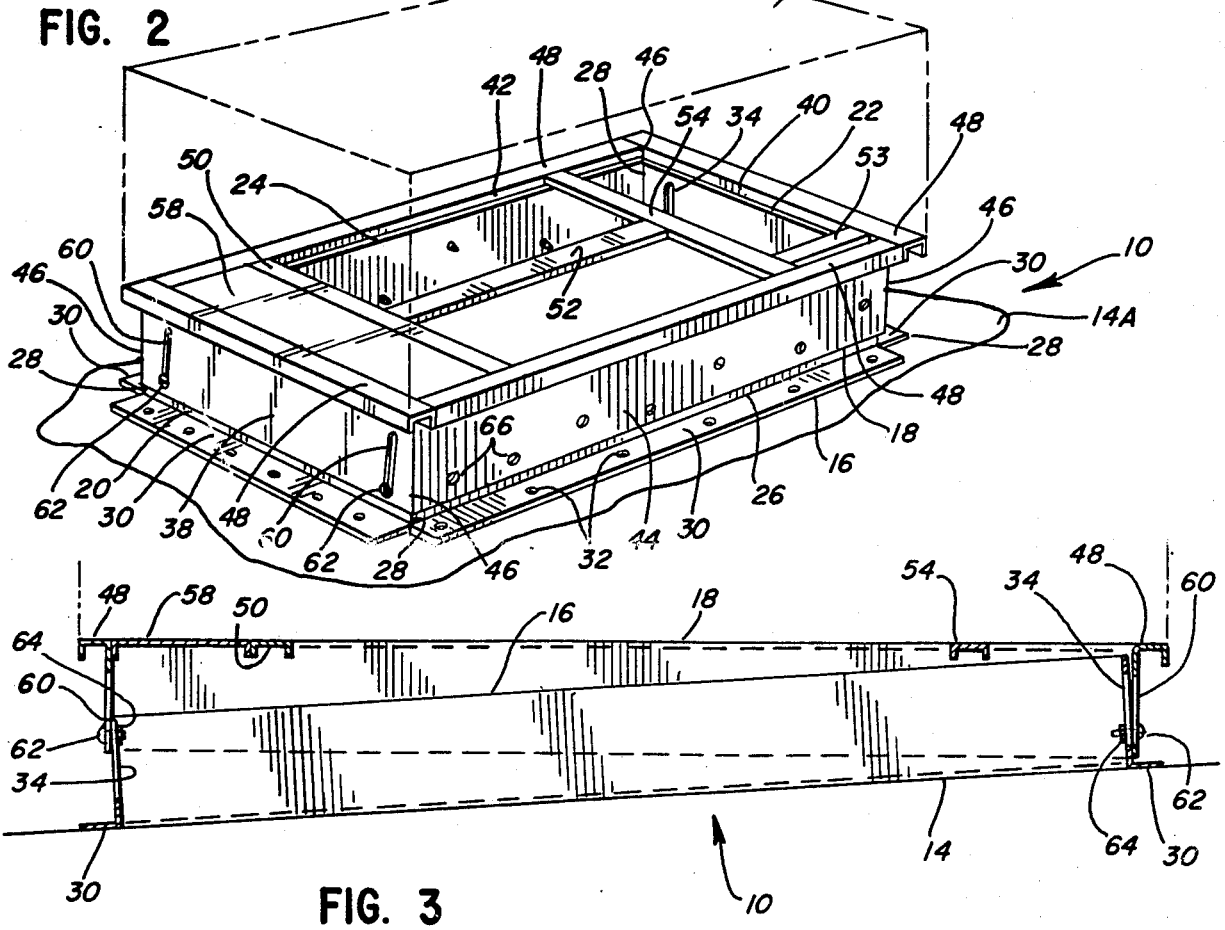
FIG. 2
FIG. 3

4,917,345

ADJUSTABLE ROOF CURB

This is a continuation of Application Ser. No. 07/201,955 filed June 3, 1988 now abandoned.

FIELD OF THE INVENTION

This invention relates generally to an adjustable support structure. More specifically, the invention relates to an adjustable curb for mounting operating equipment, such as, heating, air conditioning or gas ventilating units and the like to the roof of a building.

BACKGROUND OF THE INVENTION

Heating and air conditioning units or other operating equipment frequently are mounted on a roof of a building. This type of mounting not only enables one to conserve space within the interior of a building, but provides improved air flow for the unit as well as a central, easily accessible location for ductwork and related piping and electrical connections, as well as maintenance.

In order to mount such operating equipment onto the roof, they are typically supported on a rigid support structure that itself is fastened to the roof. Normally, the support structures vary in size and shape and are constructed or assembled on site. Alternatively, a specific support structure designed for a particular roof shape and a particular heating and/or air conditioning unit is provided by the unit's manufacturer. These structures are designed to provide a relatively level mounting structure for the piece of equipment being mounted.

Normally, these structures do not provide any adjustability for different roof conditions or different pieces of equipment. For example, the pitch as well as the composition of the roof's surface frequently varies from job site to job site. These existing support structures, however, are non-adjustable; each is used for either a flat roof or a pitched roof for a specific piece of equipment which is not interchangeable for use under varying roof pitch conditions or different operating equipment. Examples of such support structures are described in U.S. Pat. Nos. 3,521,414 and 4,399,975.

Additionally, it is sometimes necessary to further level the support structure with respect to the horizontal ground plane after it is fastened to the roof in order to provide a level engagement surface for the operating equipment, i.e., a heating and/or air conditioning unit. With existing support structures, if a small amount of adjustment is necessary, shims or the like can be positioned about the support structure until the structure is satisfactorily leveled. However, if a larger adjustment is necessary, the structure itself must be significantly modified or replaced with a new structure.

Support structures for adjustably mounting operating equipment on a pitched roof of a building are also known. One such support structure is described in U.S. Pat. No. 3,742,659. In that patent, an apparatus for mounting equipment on a roof is disclosed having cooperating compartmented members that pivot on each other to form a level platform. Since the compartmented members are pivotally secured at one end, they are only capable of adjusting in one direction. Additionally, since the apparatus is tapered from front to rear, it is not capable of providing a level platform on a relatively level roof surface.

It would therefore be advantageous to provide an adjustable roof curb that can be adjusted in a plurality of directions in order to adapt to different roof pitches including a flat roof surface and which can be used with a variety of types of operating equipment.

SUMMARY OF THE INVENTION

The present invention provides an adjustable support structure for operating equipment that is adjustable in a plurality of directions so as to enable level mounting of the equipment with respect to the horizontal plane on surfaces of a roof, for instance, of varying pitch. To this end, the invention provides an adjustable support structure having a base member, a support member capable of accepting and supporting desired operating equipment, and means for adjustably coupling the support member to the base member wherein the coupling means is adjustable to position the support member in a plurality of directions and maintain the support member in a desired position with respect to the base member.

BRIEF DESCRIPTION OF THE DRAWINGS

FIG. 1 is a perspective view of an embodiment of the adjustable support structure of the present invention attached to a pitched roof surface illustrating a desired piece of equipment in dotted outline;

FIG. 2 is a perspective view of the adjustable support structure of the present invention attached to a flat roof structure illustrating a desired piece of equipment in dotted outline;

FIG. 3 is a cross-sectional view of the adjustable support structure of the present invention taken along lines 3—3 of FIG. 1.

DESCRIPTION OF THE PREFERRED EMBODIMENTS

Figure 4:
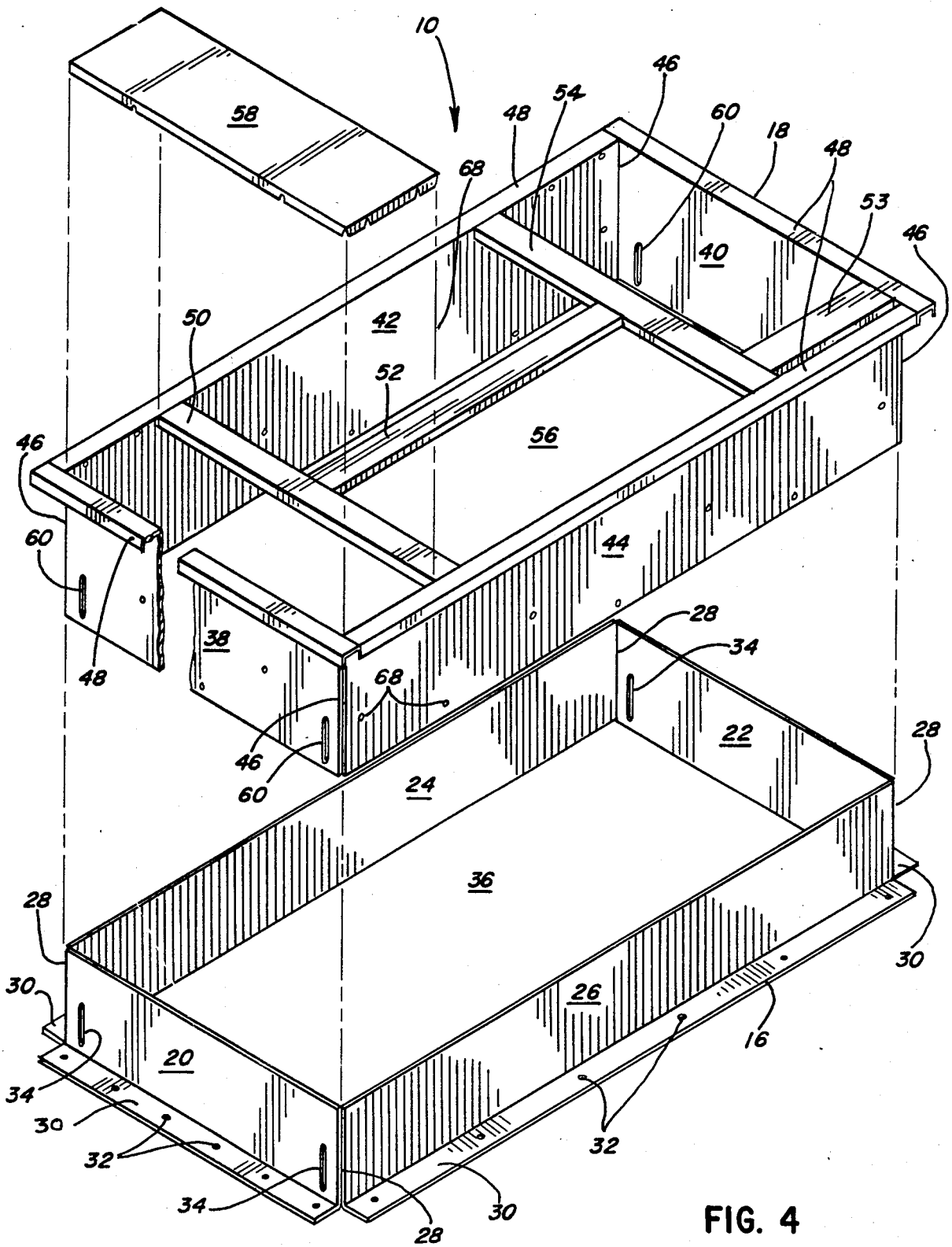
FIG. 4 is an exploded view of the adjustable support structure of the present invention illustrating its various components.

As used herein, the term "equipment" includes a heating and/or air conditioning unit or similar device that is to be secured to a surface, such as that of a roof.

Referring now to FIG. 1, an embodiment of the adjustable support structure of the present invention is generally indicated by reference numeral 10, commonly is referred to as a "curb", normally is used to support and mount an operating equipment 12 to a roof surface 14. It should be understood, however, that the support structure 10 can be mounted on a variety of surfaces.

The support structure 10, in the illustrated embodiment, includes a base member 16 and the support member 18. Preferably, both the base member 16 and the support member 18 are rectangular in shape, are hollow, and are open on their top and bottom sides. Additionally, the support member 18 is dimensioned to be slightly larger than the base member 16 so that it can fit over the base member 16 and be spaced from and adjustable relative to the base member 16 as will be described in greater detail hereinafter.

The base member 16 is formed as a thin-walled rectangular frame that is defined by a front side 20, a rear side 22, a left side 24, and a right side 26. Each of these sides 20, 22, 24, and 26 is formed from a thin piece of sheet metal, such as, for example, galvanized sheet steel, to a desired length, width, and height. In this exemplary embodiment, the sides 20, 22, 24, and 26 are made from 16 or 18 gauge galvanized sheet steel; are secured together at their corners 28 by a fastener, welding, or with any other desired fastening means; and form a base member 16 having the general dimensions of 65"×32⅜"×8"(165.10 cm×82.23 cm ×20.32 cm). It is to be understood, however, that the dimensions and shape of the base member 16 may vary without departing from the teachings of the present invention to match varying sizes and numerous manufacturers products.

In order to secure the base member 16 to the roof surface 14, the base member 16 is formed with an outwardly extending peripheral flange 30 around the bottom thereof. The flange 30 is formed with a plurality of apertures 32 spaced along its length that accept a fastener (not shown) such as a roofing nail or screw to secure the flange 30 and base member 16 to the roof surface 14. The flange 30 is preferably integrally formed with each side 20, 22, 24, and 26 by merely bending the bottom of each side 20, 22, 24, and 26 outward to form a right angle or "L" shape. Alternatively, the flange 30 can be affixed to each side 20, 22, 24, and 26 with any desired fastening means or the base member 16 can be affixed to the roof surface 14 without the flange 30.

In the exemplary embodiment, the front side 20 and rear side 22 of the base member 16 are formed with at least two slotted apertures 34. The slotted apertures 34 extend through the base member 16 into its interior 36 and enable adjustable coupling of the support member 18 with respect to the base member 16 and the horizontal plane, as will be described later. It is to be noted that the number, as well as the positions of the slotted apertures 34, can vary and both the left side 24 and the right side 26 of the base member 16 can also be formed with slotted apertures 34, if desired.

The support member 18 is formed similar to the base member 16. The support member 18 is constructed as a thin-walled rectangular frame that is defined by a front side 38, a rear side 40, a left side 42, and a right side 44. Each side 38, 40, 42, and 44 is formed from a thin piece of sheet metal, such as, for example, galvanized sheet steel, to a desired length, width, and height. In the exemplary embodiment, the sides 38, 40, 42, and 44 are made from 16 or 18 gauge galvanized sheet steel; are secured together at their corners 46 by a fastener, welding, or with any other desired fastening means; and form a support member 18 that is slightly larger than the base member 16 having the general dimensions of 65⅝"×32½"×13¾"(166.68 cm× 82.55 cm ×34.92 cm). As with the base member 16, it is to be understood that the dimensions and shape of the support member 18 may vary without departing from the teachings of the present invention.

In order to provide an engagement surface on the top of the support member 18 for the equipment 12 to be mounted on, the support member 18 can be formed with an outwardly extending peripheral flange or lip 48 around the top thereof. The lip 48 is formed as a channel that is generally "U" shaped. The lip 48 can be integrally formed with each side 38, 40, 42, and 44; can be affixed to each side 38, 40, 42, and 44 by a desired fastening means; or can be eliminated altogether. Furthermore, the channel formed by the lip 48 can be enhanced with a piece of wood or similar member to provide a nailing strip for roofing materials.

In order to further stabilize the support member 18 in a horizontal direction, a plurality of supporting struts 50, 52, 53, and 54 can be placed within the interior 56 near the top of the support member 18. The support struts 50 and 54 extend laterally across the interior 56 of the support member 18 while the support struts 52 and 53 extend longitudinally across the interior 56 of the support member 18. The support strut 52 connects the two support struts 50 and 54, while the support strut 53 connects the support strut 54 to the rear side 40 of the support member 18. These support struts 50, 52, 53, and 54 provide stability for the support member 18 in both a lateral and longitudinal direction and can be secured to the side walls 38, 40, 42, and 44 of the support member 18 by fasteners, welding or similar means. Clearly, the number, size, shape, and position of the support struts 50, 52, 53, and 54 can vary, depending upon the manufacturer's requirement specifications for his equipment to be supported by the support member 18.

To further stabilize the support member 18 and to decrease the size of the interior 56 of the support member 18, a panel 58 may be secured between the front side 38 and the support strut 50 of the support member 18. Alternatively, the panel 58 can be secured between the rear side 40 and the support strut 54 or between the support strut 52 and either the left side 42 or right side 44 of the support member 18.

At least two slotted apertures 60 are formed through both the front side 38 and rear side 40 of the support member 18. As can be discerned from the drawings, the slotted apertures 60 of the support member 18 line up with the slotted apertures 34 of the base member 16 when the support member 18 is positioned about the base member 16. Preferably, the number and position of the slotted apertures 60 of the support member 18 correspond to the number and position of the slotted apertures 34 of the base member 16.

As best illustrated in FIGS. 1, 2, and 3, the aligned slotted apertures 34 and 60 accept a fastener, such as a threaded bolt 62 that is secured on the interior 56 of the support member 18 by a corresponding retaining member, lock washer, or nut 64. The bolts 62 and the nuts 64 cooperate with the slotted apertures 34 and 60 to thereby provide an adjustable coupling between the support member 18 and base member 16. This is accomplished since the support member 18 is slightly larger than and is spaced from the base member 16 and can move vertically with respect to the base member 16 while the bolts 62 are maintained within the slotted apertures 34 and 60. When the nuts 64 are relieved or loosened, the front side 38 of the support member 18 can be raised to a desired position with respect to the base member 16 and the horizontal plane, as illustrated in FIGS. 1 and 3. Thereafter, the nuts 64 can be engaged or tightened to secure the support member 18 in the desired position with respect to the base member 16 and the horizontal plane. It is also to be understood that any of the remaining sides 40, 42, and 44 of the support member 18 can likewise be adjusted with respect to the base member 16 and the horizontal plane. Accordingly, the support member 18 can be adjusted in a plurality of directions with respect to the base member 16 and the horizontal plane to provide proper leveling of the support member 18 and associated equipment 12.

After the nuts 64 are tightened, in order to further secure the support member 18 the base member 16, a plurality of screws 66 can be inserted through corresponding apertures 68 formed in the sides 38, 40, 42, and 44 of the support member 18. The screws 66 preferably are self-tapping and tap into the sides 20, 22, 24, and 26 of the base member 16 to secure the support member 18 to the base member 16.

As illustrated in FIGS. 1 and 3, the support structure 10 of the present invention supports a piece of equipment 12 in a level position on a pitched roof by merely raising one end of the support member 18 to a desired distance and securing it in that position with respect to the base member 16. This provides an adjustment of the support member 18 in a longitudinal direction. Clearly, if desired, the support member 18 can be adjusted in a lateral direction as well or in a combination of the two directions. This provides adjustability of the support member 18 in a plurality of directions with respect to the base member 16 and the horizontal plane as described earlier. This feature enables the support member 18 to be precisely leveled.

Alternatively, as illustrated in FIG. 2, the support structure 10 can be used on a flat roof surface 14a without modifying the support structure 10. In this instance, the support structure 10 provides a relatively easy way of leveling the equipment 12 by permitting the support member 18 to adjust with respect to the base member 16 in a plurality of directions. In either event, the support member 18 can be adjusted in both a lateral and longitudinal direction to provide a versatile mounting surface for the equipment 12 that can be adjusted to conform to a variety of roof surfaces and conditions.

To assemble the support structure 10, a base member 16 having a desired length, width, and height is secured to the roof surface 14 by fasteners (not shown) that extend through the apertures 32 of the flange 30. Thereafter, a support member 18 having a desired length, width, and height slightly larger than the base member 16 is placed over the base member 16. The support member 18 is spaced from and is adjustable relative to the base member 16 and the slotted apertures 60 and 34 of the support member 18 and base member 16 respectively are aligned.

Bolts 62 are then inserted through the slotted apertures 60 and 34 and are loosely held in place by their respective nuts 64. The top of the support member 18 is then leveled with respect to the horizontal and the nuts 64 are tightened. Next, the self-tapping screws 66 are inserted within the apertures 68 in the support member 18 and tap into the sides of the base member 16 to further secure the support member 18 with respect to the base member 16. Finally, a desired piece of equipment 12 is mounted on the lip 48 on the top of the support member 18 and may be secured thereto if desired.

After assembly of the adjustable support structure 10, in order to finish off the roof structure, roof insulation, roof felt, and roof tar can be applied as specified.

It is to be noted that due to the open frame design of the support structure 10 of the present invention an opening is provided through the interiors 36 and 56 of the base member 16 and support member 18 respectively. This open interior design enables any necessary ductwork, wiring, or piping to reach the equipment 10 through the roof surface 14 directly underneath the support structure 10 without being exposed to the elements.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. An adjustable support structure for mounting a piece of equipment on a building roof in a horizontal plane relative to the ground comprising:

a base member having a top and upstanding side walls with at least two side walls being opposite and parallel to each other and an outwardly extending peripheral flange around the bottom thereof and;

a hollow support member having an open bottom end and upstanding interconnected side walls with at least two side walls being opposite and parallel to each other, said support member being dimensionally larger than the base member and installed over and surrounding the top and side walls of the base member, said side walls of the base and support members being spaced apart, the base and support members having a plurality of pairs of slotted apertures in said at least two side walls thereof with said slotted apertures located in each end of said at least two side walls the apertures of each pair in registry one with the other, said slotted apertures located adjacent opposite longitudinal ends of the support structure; and each pair of slotted apertures having a fastener extending therethrough for adjustably coupling the support member to the base member, said support member being selectively adjustable at each of said opposite longitudinal ends thereof in both a lateral and longitudinal angular direction relative to the base member for maintaining the equipment oriented in said horizontal plane regardless of the angle of inclination of the roof surface.

2. The support structure of claim 1 wherein the means for adjustably coupling includes at least one threaded bolt that extends through at least one of the aligned slotted apertures of the base member and the support member, the at least one threaded bolt being secured by a retaining member where the retaining member can be relieved and the threaded bolt can be adjusted within the slot to a desired position in order to position the support member in a plurality of directions with respect to the base member and the retaining member can be engaged to maintain the threaded bolt and the support member in the desired position.

3. The support structure of claim 1 wherein the support member is a thin-walled, rectangular frame further having an open top and a laterally extending peripheral flange around the top thereof.

4. The support structure of claim 3 wherein said peripheral flange extends either inwardly or outwardly relative to said rectangular frame.

5. The support structure of claim 1 wherein the base member is a hollow, thin-walled, rectangular frame having an open top and bottom.

6. The support structure of claim 1 wherein the fasteners are threaded bolts having corresponding retaining members.

7. The support structure of claim 1 further having a means for further securing, the support member to the base member after the support member is positioned with respect to the base member.

8. An adjustable support curb for mounting a desired piece of equipment on either a flat or pitched roof of a building comprising:

a thin-walled, hollow, rectangular frame base member having a first length, width, and height and an open top and bottom, the base member having an outwardly extending peripheral flange around the bottom thereof that has a plurality of apertures extending therethrough for securing the base member to the roof, the base member also having at least two slotted apertures positioned in opposing walls at their ends thereof extending through the base member into it interior, the length of the slots extending in a direction parallel to the height of the base member;

a thin-walled, hollow, rectangular frame support member surrounding the base member having a second length, width, and height slightly greater than the first length, width, and height of the base member forming a slight gap between the support member and the base member, the support member being adjustable in a plurality of directions relative to the base member and having an open top and bottom, an outwardly extending peripheral flange around the top thereof for engagement with the piece of equipment and at least one internal support strut extending across its hollow interior connecting at least two sides of the support member near the top surface of the support member, the support member having at least two slotted apertures positioned in opposing walls at their ends thereof extending through the support member, the slotted apertures of the support member being positioned so that they align with the slotted apertures of the base member when the support member is positioned about the base member; and a plurality of threaded fasteners, at least one threaded fastener extending through each of the aligned slotted apertures of the support member and the base member, the threaded fasteners being secured by corresponding retaining members in order to adjustably couple the support member to the base member and position the support member in a plurality of directions where the retaining members can be relieved and the threaded fasteners can be adjusted within the slotted apertures to a desired position in order to position the support member in a plurality of directions with respect to the base member and the horizontal plane and the retaining members can be engaged to maintain the threaded fasteners and the support member in the desired position.

9. The support curb of claim 8 further having a means for further securing the support member to the base member after the support member is positioned with respect to the base member and the horizontal plane.

10. An adjustable roof curb structure for mounting apparatus on an inclined or flat roof surface in which said apparatus is mounted horizontally relative to ground comprising:

a base member having interconnected, upstanding planar walls defining a hollow, rectangular frame;

a support member having interconnected upstanding planar walls defining a hollow rectangular frame and having said base member nested therein with the walls of said members arranged in opposing relationship, said support member constructed and arranged to mount the apparatus thereon;

said base member having flange means for mounting the base member to said roof surface;

said base member and support member having cooperating slot and fastener means in both ends of each opposing walls for adjustably coupling the support member relative to the base member in both a lateral and a longitudinal direction whereby said apparatus mounted thereon can be oriented in a horizontal plane relative to ground, said means including linear slots in opposing planar walls of said members and extending in a direction transverse to the roof surface adapted to receive said fasteners therethrough for such adjustable coupling of said members, said means being located adjacent opposite ends of the curb structure so that said members can be adjustably coupled selective at each such end thereof.

* * * * *